(12) United States Patent
Nakano et al.

(10) Patent No.: US 12,117,561 B2
(45) Date of Patent: Oct. 15, 2024

(54) OPTICAL APPARATUS, AND IN-VEHICLE SYSTEM AND MOVING APPARATUS EACH INCLUDING THE SAME

(71) Applicant: CANON KABUSHIKI KAISHA, Tokyo (JP)

(72) Inventors: Masatsugu Nakano, Tochigi (JP); Ryo Iijima, Tochigi (JP); Shin Kuwashiro, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 219 days.

(21) Appl. No.: 17/575,216

(22) Filed: Jan. 13, 2022

(65) Prior Publication Data

US 2022/0229156 A1 Jul. 21, 2022

(30) Foreign Application Priority Data

Jan. 20, 2021 (JP) .................................. 2021-007468
Jan. 20, 2021 (JP) .................................. 2021-007469
Jan. 20, 2021 (JP) .................................. 2021-007470

(51) Int. Cl.
  *G01S 7/481* (2006.01)
  *G01S 17/931* (2020.01)

(52) U.S. Cl.
  CPC ........... *G01S 7/4811* (2013.01); *G01S 7/4817* (2013.01); *G01S 17/931* (2020.01)

(58) Field of Classification Search
  CPC .... G01S 7/4811; G01S 7/4817; G01S 17/931; G01S 7/4812; G02B 9/64; G02B 26/101; G02B 26/105
  See application file for complete search history.

(56) References Cited

U.S. PATENT DOCUMENTS

| 4,679,891 A | 7/1987 | Roberts |
| 2004/0075914 A1* | 4/2004 | Yamamoto ......... G02B 26/0833 359/291 |
| 2006/0245049 A1* | 11/2006 | Knebel .................. G02B 21/18 359/368 |
| 2015/0103413 A1* | 4/2015 | Uchida .................. G02B 13/18 359/694 |

(Continued)

FOREIGN PATENT DOCUMENTS

| CN | 106772949 A | 5/2017 |
| JP | H08507882 A | 8/1996 |

(Continued)

*Primary Examiner* — Omeed Alizada
(74) *Attorney, Agent, or Firm* — Canon U.S.A., Inc. IP Division

(57) ABSTRACT

An optical apparatus includes a deflection unit configured to deflect illumination light from a light source to scan an object and to deflect reflected light from the object, a light guiding unit configured to guide the illumination light from the light source to the deflection unit and to guide the reflected light from the deflection unit to a light receiving element, and an optical system configured to guide the illumination light from the deflection unit to the object and to guide the reflected light from the object to the deflection unit. The optical system includes a front lens unit that consists of lenses located closer to the object than an intermediate image and a rear lens unit that consists of lenses located closer to the deflection unit than the intermediate image. The rear lens unit consists of three or more and five or less positive lenses.

20 Claims, 9 Drawing Sheets

(56) References Cited

U.S. PATENT DOCUMENTS

2015/0145981 A1* 5/2015 Anhut ................ G01N 21/6458
   348/80
2016/0144838 A1* 5/2016 Spencer ............ B60W 30/0953
   701/1

FOREIGN PATENT DOCUMENTS

| JP | 2013228631 A | 11/2013 |
| JP | 2016166907 A | 9/2016 |
| JP | 2018010215 A | 1/2018 |
| JP | 2019113408 A | 7/2019 |
| JP | 2019120616 A | 7/2019 |
| JP | 2020177012 A | 10/2020 |
| WO | 2014181749 A | 11/2014 |

* cited by examiner

OPTICAL APPARATUS, AND IN-VEHICLE SYSTEM AND MOVING APPARATUS EACH INCLUDING THE SAME

BACKGROUND

Field of the Disclosure

The present disclosure relates to an optical apparatus that receives reflected light from an illuminated target object to detect the target object.

Description of the Related Art

As a distance measuring apparatus that measures the distance to a target object, there is known an apparatus that scans a target object by deflecting illumination light from a light source by using a deflection unit, and calculates the distance to the target object based on the time taken before receiving the reflected light from the target object and the phase of the reflected light.

Japanese Patent Application Laid-Open No. 2019-113408 discusses a distance measuring apparatus in which the diameter of each of illumination light and reflected light can be changed by an optical system disposed closer to a target object than a deflection unit.

In the distance measuring apparatus discussed in Japanese Patent Application Laid-Open No. 2019-113408, a lens array is employed in the optical system to improve the distance measurement accuracy. However, in a case where a lens array is used as in Japanese Patent Application Laid-Open No. 2019-113408, the configuration of an optical system is complicated and a placement error of each member easily occurs, and therefore, the difficulty of manufacturing a distance measuring apparatus increases.

SUMMARY

According to an aspect of the present invention, an optical apparatus includes a deflection unit configured to deflect illumination light from a light source to scan an object and to deflect reflected light from the object, a light guiding unit configured to guide the illumination light from the light source to the deflection unit and to guide the reflected light from the deflection unit to a light receiving element, and an optical system configured to guide the illumination light from the deflection unit to the object and to guide the reflected light from the object to the deflection unit, wherein the optical system includes a front lens unit configured to form an intermediate image of the object and to consist of lenses located closer to the object than the intermediate image and a rear lens unit configured to consist of lenses located closer to the deflection unit than the intermediate image, and wherein the rear lens unit consists of three or more and five or less positive lenses.

Further features of the present invention will become apparent from the following description of exemplary embodiments with reference to the attached drawings.

DESCRIPTION OF THE EMBODIMENTS

Figure 1:
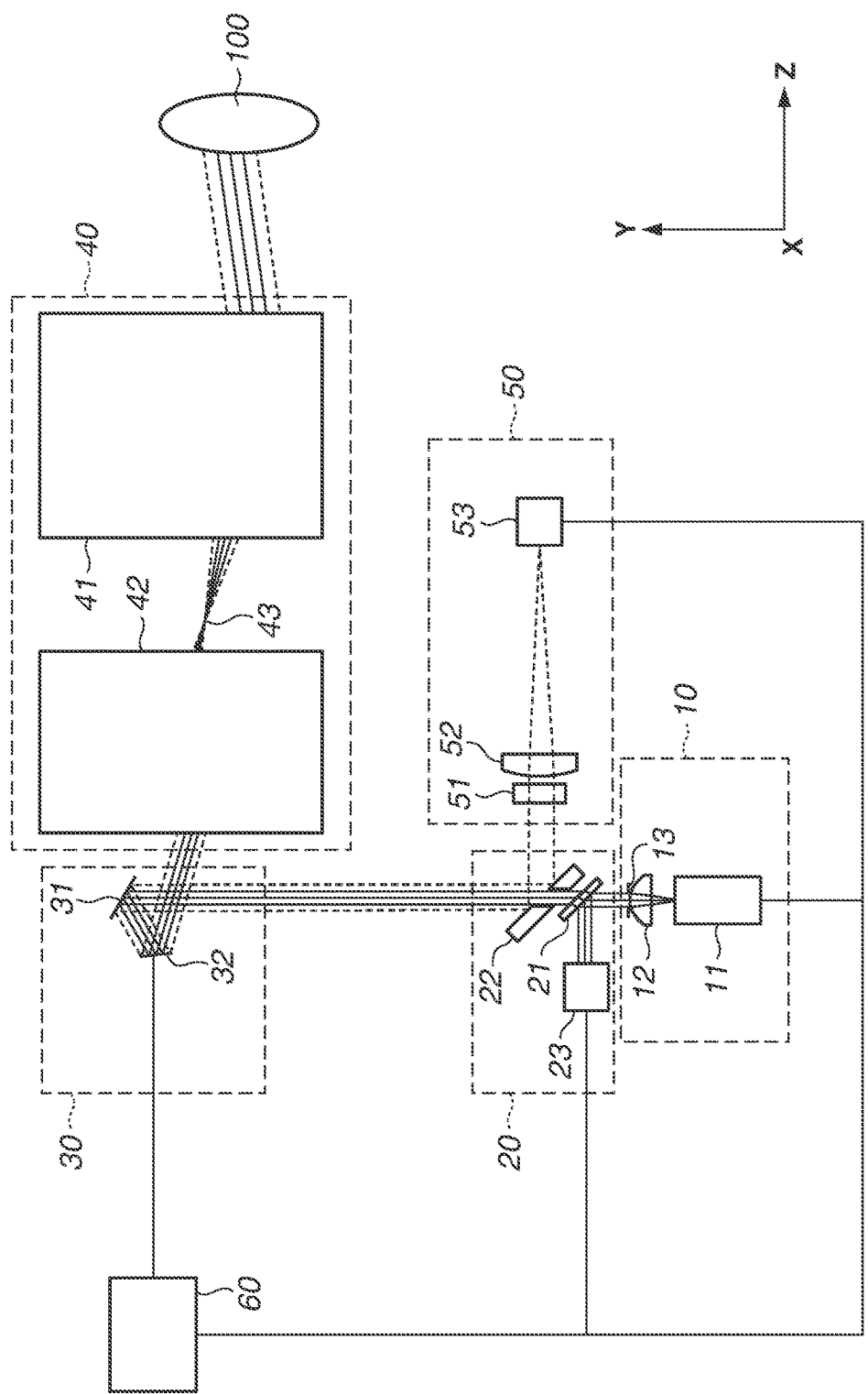
FIG. 1 is a schematic diagram of a main portion of an optical apparatus according to an exemplary embodiment.

An exemplary embodiment of the present invention will be described below with reference to the drawings. The drawings may each be illustrated in a scale different from the actual scale for the purpose of illustration. In the drawings, the same members are indicated by the same reference numbers, and the description thereof will not be repeated.

FIG. 1 is a schematic diagram of a main portion of an optical apparatus 1 in a cross-section (YZ cross-section) including an optical axis, according to an exemplary embodiment of the present invention. The optical apparatus 1 includes a light source unit 10, a light guiding unit (splitting unit) 20, a deflection unit 30, an optical system 40, a light receiving unit 50, and a control unit 60. In FIG. 1, an optical path (an illumination optical path) of illumination light from the light source unit 10 toward a target object (object) 100 is indicated by a solid line, and an optical path (light receiving optical path) of reflected light from the target object 100 toward the light receiving unit 50 is indicated by a broken line.

The optical apparatus 1 can be used as a detection apparatus (image pickup apparatus) that detects (images) the target object 100, or a distance measuring apparatus that acquires the distance (distance information) to the target object 100, by receiving the reflected light from the target object 100. The optical apparatus 1 according to the present exemplary embodiment uses a technique called LiDAR (Light Detection and Ranging) to calculate the distance to the target object 100, based on the time taken before receiving the reflected light from the target object 100 and the phase of the reflected light.

The light source unit 10 includes a light source 11, an optical element 12, and a diaphragm 13. A laser such as a semiconductor laser having high energy concentration and high directivity can be used as the light source 11. For example, in a case where the optical apparatus 1 is applied to an in-vehicle system to be described below, a human being can be included in the target object 100. Therefore, desirably, a device that emits infrared light less affecting human eyes is adopted as the light source 11. The wavelength of the illumination light emitted by the light source 11 according to the present exemplary embodiment is 905 nm included in the near infrared region.

The optical element 12 has a function of changing the convergence of the illumination light emitted from the light source 11.

The optical element 12 according to the present exemplary embodiment is a collimator lens (light-condensing element) that converts (collimates) a divergent light beam emitted from the light source 11 into a parallel light beam. The parallel light beam here includes not only a strict parallel light beam, but also approximately parallel light beams such as a slightly divergent light beam and a weak convergent light beam.

The diaphragm 13 is a light shielding member provided with an aperture, and determines the light beam diameter (light beam width) of the illumination light from the optical element 12 by limiting the illumination light. The shape of the aperture of the diaphragm 13 according to the present exemplary embodiment is an oval to match the shape of the illumination light, but may be a shape other than the oval as needed. The diameter of the aperture of the diaphragm 13 according to the present exemplary embodiment is 1.60 mm in an X-direction (long axis direction) and 1.30 mm in a Z-direction (short axis direction).

The light guiding unit 20 is a member for splitting the optical path into an illumination optical path and a light receiving optical path, in order to guide the illumination light from the light source unit 10 to the deflection unit 30, and guide the reflected light from the deflection unit 30 to the light receiving unit 50. The light guiding unit 20 according to the present exemplary embodiment includes a light transmission member 21, a perforated (pierced) mirror 22, and a light-source light receiving element 23. The light transmission member 21 is provided to reflect a part of the illumination light passing through the aperture of the diaphragm 13 and guide the part to the light-source light receiving element 23. For example, a glass substrate can be used for the light transmission member 21.

The perforated mirror 22 is a reflection member provided with an opening (hole) for allowing the illumination light from the light source unit 10 to pass therethrough, and reflects the reflected light from the deflection unit 30 toward the light receiving unit 50 by a reflection region (reflection portion) excluding the opening. The opening of the perforated mirror 22 according to the present exemplary embodiment is an empty hele as illustrated in FIG. 1, but the opening may be provided with a light transmission member. Further, as the light-guiding member (splitting member) for splitting the light into the illumination light and the reflected light, not only the perforated mirror, but also a beam splitter, a prism, a half mirror, or the like may be used.

The light-source light receiving element 23 is an element for photoelectrically converting the illumination light from the light source unit 10 and outputting a signal, and, for example, a sensor similar to a light receiving element 53 to be described below in the light receiving unit 50 can be used. The signal output from the light-source light receiving element 23 is used when the control unit 60 to be described below controls the light source unit 10. An optical element (such as a filter or a lens) for guiding the light from the light transmission member 21 to the light receiving surface of the light-source light receiving element 23 may be disposed between the light transmission member 21 and the light-source light receiving element 23, as needed.

The deflection unit 30 is a member for deflecting the illumination light from the light guiding unit 20 to scan the target object 100, and for deflecting the reflected light from the target object 100 and guiding the deflected light to the light guiding unit 20. The deflection unit 30 according to the present exemplary embodiment consists of a return mirror 31 (first deflection element) and a drive mirror 32 (movable mirror, or second deflection element).

It is desirable that the drive mirror 32 be swingable about at least two axes (be a 2-axis drive mirror) so that the target object 100 can be two-dimensionally scanned. For example, a galvanometer mirror or a Micro Electro Mechanical System (MEMS) mirror can be adopted as the drive mirror 32.

The drive mirror 32 according to the present exemplary embodiment is a MEMS mirror with a swinging angle (deflection angle) of approximately ±7.5 degrees around an X-axis, a swinging angle of approximately ±15.0 degrees around a Y-axis, and a swinging frequency of approximately 1 kHz. The swinging angle of the drive mirror 32 around the X-axis corresponds to an angle of field (scanning field angle) in the YZ cross-section, and the swinging angle of the drive mirror 32 around the Y-axis corresponds to an angle of field in a ZX cross-section.

The optical system 40 is a member for guiding the illumination light from the deflection unit 30 to the target object 100, and also guiding the reflected light from the target object 100 to the deflection unit 30. The optical system 40 according to the present exemplary embodiment is an optical system consisting of a plurality of lenses having refractive power (power), and having no refractive power as a whole (an afocal system). Specifically, the optical system 40 is a telescope that increases the diameter of the illumination light from the deflection unit 30 by $\beta$ times, and reduces the diameter of the reflected light from the target object 100 by $1/\beta$ times.

The optical system 40 according to the present exemplary embodiment includes a front lens unit 41 having a plurality of lenses, and a rear lens unit 42 having a plurality of lenses, disposed in order from the target object 100 side (the object side) to the deflection unit 30 side (the deflection unit side). The front lens unit 41 is configured to condense the reflected light from the target object 100 to form an intermediate image 43 of the target object 100. The rear lens unit 42 is configured to convert the reflected light from the front lens unit 41 into a parallel light beam to be incident on the drive mirror 32. This configuration enables the optical system 40 to convert the diameter of each of the illumination light from the deflection unit 30 and the reflected light from the target object 100. The optical system 40 may include other members such as a diaphragm, a filter, and a cover glass other than the front lens unit 41 and the rear lens unit 42.

The deflection surface of the drive mirror 32 according to the present exemplary embodiment is located at a position conjugated with an entrance pupil of the optical system 40 when the target object 100 side is the incident side. In other words, the deflection surface of the drive mirror 32 is located at the position of the entrance pupil of the optical system 40 when the deflection unit 30 side is the incident side. Further, the absolute value of an optical magnification (lateral magnification) $\beta$ of the optical system 40 according to the present exemplary embodiment is greater than 1 ($|\beta|>1$). Therefore, the deflection angle of the principal ray of the illumination light output from the optical system 40 is smaller than the deflection angle of the principal ray of the illumination light deflected by the drive mirror 32 and incident on the optical system 40, so that the resolution in detecting the target object 100 can be improved.

The illumination light from the light source unit 10 is deflected by the deflection unit 30 via the light guiding unit 20, and enlarged by the optical system 40 based on the optical magnification $\beta$ to illuminate the target object 100. Further, the reflected light from the target object 100 is reduced by the optical system 40 based on the optical magnification $1/\beta$, deflected by the deflection unit 30, and arrives at the light receiving unit 50. This can further reduce the spread angle by further increasing the diameter of the illumination light, and thus sufficient illuminance and resolution can be secured even in a case where the target object 100 is at a distance. In addition, it is possible to take in more reflected light from the target object 100 by increasing the pupil diameter using the optical system 40, so that the measurement distance and the distance measurement accuracy can be improved.

The light receiving unit (light receiving unit for distance measurement) 50 includes an optical filter 51, a light condenser 52, and the light receiving element (light receiving element for distance measurement) 53. The optical filter 51 is a member for transmitting only desired light, and blocking (absorbing) unnecessary light, i.e., light except the desired light. The optical filter 51 according to the present exemplary embodiment is a bandpass filter that passes only light in a wavelength band corresponding to the illumination light emitted from the light source 11. The light condenser 52 is a member for condensing the light that has passed through the optical filter 51 on the light receiving surface of the light receiving element 53, and consists of a single optical element (condenser lens) in the present exemplary embodiment.

The configuration of each of the optical filter 51 and the light condenser 52 is not limited to that of the present exemplary embodiment, and the members may be replaced with each other in the placement order or may each be disposed as a plurality of members as needed. For example, the light condenser 52 may consist of a plurality of condenser lenses.

The light receiving element (light receiving element for distance measurement) 53 is an element (sensor) for receiving light from the light condenser 52 and photoelectrically converting the received light to output a signal. An element consisting of a photodiode (PD), an avalanche photodiode (APD), or a single photon avalanche diode (SPAD) can be adopted as the light receiving element 53. The reflected light from the target object 100 illuminated by the illumination light is deflected by the deflection unit 30 and reflected by the perforated mirror 22 to be incident on the light receiving element 53 via the optical filter 51 and the light condenser 52.

The control unit 60 controls the light source 11, the light-source light receiving element 23, the drive mirror 32, and the light receiving element 53. The control unit 60 is, for example, a processing device (processor) such as a central processing unit (CPU), or an arithmetic device (computer) provided with the processing device. The control unit 60 drives each of the light source 11 and the drive mirror 32 at a predetermined drive voltage or a predetermined drive frequency, and controls the output (the amount of the illumination light) of the light source 11 based on a signal from the light-source light receiving element 23. The control unit 60 can also, for example, change the illumination light to pulsed light by controlling the light source 11, and generate signal light by modulating the intensity of the illumination light.

Further, the control unit 60 can acquire the distance information of the target object 100, based on the time from when the illumination light is emitted from the light source 11 (light emission timing) to when the reflected light from the target object 100 is received by the light receiving element 53 (light receiving timing). At this moment, the control unit 60 may acquire a signal from the light receiving element 53 at a specific frequency. The control unit 60 may acquire the distance information based on the phase of the reflected light from the target object 100, instead of the time taken before receiving the reflected light from the target object 100. Specifically, the control unit 60 may acquire the distance information of the target object 100 by determining the difference (phase difference) between the phase of the signal of the light source 11 and the phase of the signal output from the light receiving element 53, and multiplying this phase difference by the velocity of light.

The optical apparatus 1 as such a distance measuring apparatus using LiDAR is suitable for an in-vehicle system that distinguishes the target object 100 such as a vehicle, a pedestrian, or an obstacle, and controls the own vehicle based on the distance information of the target object 100. In a case where LiDAR is used, it is possible to adopt a coaxial system in which the optical axis of the light source unit 10 and the optical axis of the light receiving unit 50 partially coincide with each other, or a non-coaxial system in which the optical axes do not coincide with each other. The optical apparatus 1 according to the present exemplary embodiment includes the light guiding unit 20, thereby implementing the coaxial system while downsizing the entire apparatus.

In an in-vehicle system or the like, it is desired to detect a range of objects from an object at a short distance (about 1 m) to an object at a long distance (about 300 m) from the optical apparatus 1, as the target objects 100. However, the intensity of the reflected light (signal light) from the target object 100 is very feeble, for example, about $10^{-7}$ to $10^{-8}$ when the power of the illumination light emitted from the light source 11 is 1. In addition, the intensity of the reflected light from the target object 100 is lower as the distance from the optical apparatus 1 to the target object 100 is longer. For example, in a case where the distance from the optical apparatus 1 to the target object 100 increases 10 times, the intensity of the reflected light received by the optical apparatus 1 decreases to about $\frac{1}{100}$.

Here, if reflected light (scattering light) unintentionally generated in each member inside the optical apparatus 1 arrives at the light receiving element 53 as unnecessary light (stray light), this greatly affects the distance measurement accuracy. For example, if the ratio of the unnecessary light to the signal light received by the light receiving element 53 increases, the signal to noise (S/N) ratio decreases, thereby making it difficult to distinguish between the signal light and the unnecessary light, so that the distance measurement accuracy decreases to a great extent. A method of increasing the amount of the illumination light (the output of the light source 11) based on an increase in the distance to the target object 100 is conceivable, but this method is not desirable because the influence on the eyes of a person as the target object 100 is large.

Such unnecessary light is easily generated, in particular, on the lens surface located subsequent to the light guiding unit 20.

In the present exemplary embodiment, because the optical system 40 disposed closer to the target object 100 than the light guiding unit 20 includes the plurality of lenses, there is a possibility that the illumination light becomes the unnecessary light when reflected (scattered) by each of the lens surfaces. Therefore, to suppress the generation of the unnecessary light on each of the lens surfaces of the optical system 40, it is desirable to design the optical apparatus 1 in such a manner that a ray (illumination ray) included in the illumination light is not perpendicularly incident on each of the lens surfaces. This will be described with reference to FIG. 2.

Figure 2:
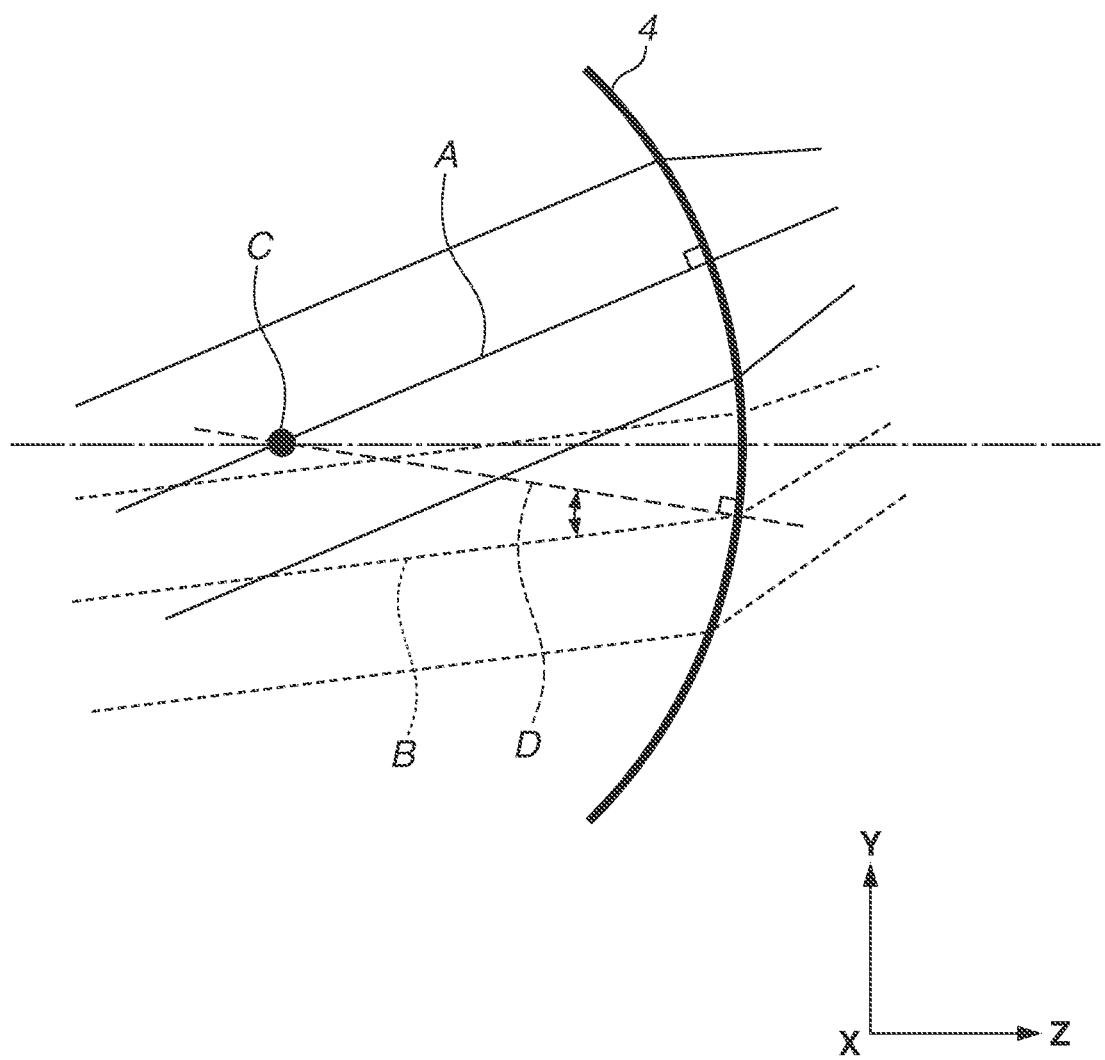
FIG. 2 is a diagram illustrating a condition under which unnecessary light is generated on a lens surface.

FIG. 2 is a schematic diagram illustrating the illumination light incident on a lens surface 4 disposed closer to the target object 100 than the deflection unit 30. The illumination light deflected by swinging of the drive mirror 32 is incident on the lens surface 4. In other words, the illumination light is incident on the lens surface 4 at various incident angles. An illumination ray A indicated by a solid line is a part of the illumination light and passes through the curvature center C of the lens surface 4, and therefore, the ray A is perpendicularly incident on the lens surface 4. In this case, the ray A is reflected by the lens surface 4 and travels on the reflection optical path opposite to the illumination optical path, and therefore, the ray A can be incident on the light receiving element 53 together with the reflected ray from the target object 100, as the unnecessary light. Even if an anti-reflection film having a reflectance ratio of about 0.1% is disposed on the lens surface 4, a part of the ray can be such unnecessary light.

On the other hand, an illumination ray B indicated by a dotted line does not pass through the curvature center C, and is therefore incident on the lens surface 4 at an incident angle to some extent. In other words, a normal line D and the illumination ray B at the incident point of the illumination ray B on the lens surface 4 are not parallel to each other (do not overlap each other). Therefore, even if the illumination ray B is reflected by the lens surface 4, the illumination ray B travels on an optical path different from the reflection optical path, so that the unnecessary light is not generated. Therefore, to suppress the generation of the unnecessary light in the optical system 40, the deflection unit 30 and the optical system 40 may be disposed in such a manner that each of the illumination rays incident on each of the lens surfaces does not pass through the curvature center of each of the lens surfaces (is not perpendicularly incident on each of the lens surfaces).

Specifically, it is desirable to design each of the lenses in the optical system 40 in such a manner that the normal line at the incident point of the illumination ray on each of the lens surfaces of the optical system 40 and the illumination ray are not parallel to each other, in other words, each of the illumination rays is not perpendicularly incident on each of the lens surfaces. For example, it is possible to prevent the illumination ray from being perpendicularly incident on each of the lens surfaces, by designing each of the lenses while confirming the incident angle of each of the illumination rays with respect to each of the lens surfaces in the optical system 40, using known optical simulation software or the like. Design parameters for each of the lenses are a curvature (curvature radius), a thickness (a thickness in an optical-axis direction), a surface shape, and a position in a direction perpendicular to an optical axis (decentering), but are not limited thereto. The shape of each of the lens surfaces may be aspherical, but is, desirably, spherical considering the easiness of molding.

The deflection unit 30 and the optical system 40 may be disposed at positions displaced (shifted) with respect to each other in a Y-direction, in order to reduce the illumination rays perpendicularly incident on each of the lens surfaces. To realize this configuration, the deflection unit 30 may be disposed in such a manner that the optical path of the principal ray of the illumination light at a central field angle in the scan range of the drive mirror 32 and the optical axis of the optical system 40 do not coincide with each other, in a cross-section (the YZ cross-section) including the illumination optical path and the reflection optical path. It is possible to obtain a similar effect by setting (tilting) the scan range of the deflection unit 30 asymmetrically with respect to the optical axis of the optical system 40, instead of shifting the deflection unit 30 and the optical system 40 with respect to each other. The tilting may be combined with the shifting. Further, at least one of the shifting and the tilting may be combined with the above-described design of each of the lenses.

Here, in a case where the configuration for suppressing the generation of the unnecessary light is adopted as described above, the freedom of the design of the optical system 40 decreases in comparison with a case where this configuration is not adopted. In particular, in the rear lens unit 42 on which the illumination light from the deflection unit 30 is incident first, the freedom of the design including the shape and the location of each of the lenses decreases to a great extent. Therefore, in order to achieve both of the downsizing and the satisfactory optical performance of the optical system 40, it may be desirable to design in such a manner that the number of lenses forming the rear lens unit 42 and the sign of the refractive power of each of the lenses are appropriate.

As a result of trial and error, the present inventor has found that both of the downsizing of the entire system and the satisfactory optical performance of the optical system 40 can be realized by having the rear lens unit 42 consisting of three or more and five or less positive lenses. According to the optical system 40 of the present exemplary embodiment, it is possible to correct aberrations successfully while downsizing the optical system 40, by using the rear lens unit 42 consisting of only the positive lenses. In a case where a negative lens is added to the rear lens unit 42, the size of the rear lens unit 42 is increased to correct aberrations successfully, in comparison with the case where the rear lens unit 42 consists of only the positive lenses.

Further, it is possible to suppress the generation of the unnecessary light while downsizing the optical system 40, by having the rear lens unit 42 consisting of three or more and five or less positive lenses. In a case where the number of the positive lenses is two or less, the overall focal length of the rear lens unit 42 is too long, so that it is difficult to downsize the optical system 40. In addition, it is difficult to prevent each of the rays incident on each of the lens surfaces in the rear lens unit 42 and the normal line at the incident point on each of the lens surfaces from being parallel, and it is therefore difficult to reduce the unnecessary light sufficiently.

Meanwhile, in a case where the number of the positive lenses is six or more, the overall focal length of the rear lens unit 42 is short, so that the intermediate image 43 is too close to the lens surface of the rear lens unit 42. In this case, the rays are concentrated near the intermediate image 43, so that the influence of scratches and dust on the lens surface is large, making it difficult to obtain satisfactory optical performance. In addition, as the number of the positive lenses increases, it is more difficult to design the rear lens unit 42 to prevent the intermediate image 43 from interfering with the lens surface.

The number of the positive lenses forming the rear lens unit 42 may be selected depending on which one of the downsizing of the optical system 40 and the reduction of the unnecessary light is given priority. For example, to further downsize the optical system 40, the number of the positive lenses forming the rear lens unit 42 is, desirably, four or five. In addition, to achieve the optimum balance between the downsizing of the optical system 40 and the reduction of the unnecessary light, the number of the positive lenses forming the rear lens unit 42 is, desirably, four.

It is desirable that the optical system 40 satisfy the following conditional expression (1), where the focal length of the front lens unit 41 is ff, and the focal length of the rear lens unit 42 is fr.

$$1.8 < f\!f/fr < 8.0 \qquad (1)$$

The target object 100 can be accurately detected even in a case where the target object 100 is at a long distance, by satisfying the conditional expression (1). If the ratio exceeds the upper limit of the conditional expression (1), the optical magnification of the optical system 40 is too large, so that the size of the entire system increases and the unnecessary light is easily generated, and therefore, such a ratio is not desirable. If the ratio falls below the lower limit of the conditional expression (1), the optical magnification of the optical system 40 is too small, so that the reflected light from the target object 100 at a long distance is not easily received, and therefore, such a ratio is not desirable.

Further, it is desirable to satisfy the following conditional expression (1a), and it is more desirable to satisfy the following conditional expression (1b), and it is yet more desirable to satisfy the following conditional expression (1c).

$$2.0 < ff/fr < 7.0 \quad (1c)$$

$$2.5 < ff/fr < 6.0 \quad (1b)$$

$$3.0 < ff/fr < 5.0 \quad (1c)$$

In addition, it is desirable that the optical system 40 satisfy the following conditional expression (2), where, for the lens closest to the deflection unit in the rear lens unit 42, the curvature radius of the lens surface on the object side is R1B1, and the curvature radius of the lens surface on the deflection unit side is R2B1.

$$-12.0 < (R1B1 + R2B1)/(R1B1 - R2B1) < -2.0 \quad (2)$$

The conditional expression (2) is an expression about the shape factor of the lens closest to the deflection unit among the positive lenses forming the rear lens unit 42. It is possible to make this lens have an appropriate meniscus shape, and to suppress the generation of the unnecessary light while making it easy to manufacture this lens, by satisfying the conditional expression (2). If the ratio exceeds the upper limit of the conditional expression (2), the shape of this lens becomes closer to a planoconvex shape or biconvex shape. In this case, to prevent the direction of the normal line and the direction of the ray on the lens surface on the deflection unit side from coinciding with each other, it may be desirable to refract the ray at an extremely large angle on this lens surface, so that it is difficult to correct an aberration, and therefore, such a ratio is not desirable. If the ratio falls below the lower limit of the conditional expression (2), the curvature of each of the lens surfaces is too large, so that it is difficult to manufacture this lens, and therefore, such a ratio is not desirable.

Further, it is desirable to satisfy the following conditional expression (2a), and it is more desirable to satisfy the following conditional expression (2b).

$$-10.0 < (R1B1 + R2B1)/(R1B1 - R2B1) < -4.0 \quad (2a)$$

$$-8.0 < (R1B1 + R2B1)/(R1B1 - R2B1) < -6.0 \quad (2b)$$

In addition, it is desirable that the optical system 40 satisfy the following conditional expression (3), where, for the lens adjacent to the lens closest to the deflection unit in the rear lens unit 42, the curvature radius of the lens surface on the object side is R1B2, and the curvature radius of the lens surface on the deflection unit side is R2B2.

$$-6.0 < (R1B2 + R2B2)/(R1B2 - R2B2) < -0.5 \quad (3)$$

The conditional expression (3) is an expression about the shape factor of the lens second from the deflection unit side among the positive lenses forming the rear lens unit 42. It is possible to make this lens have an appropriate meniscus shape, and to suppress the generation of the unnecessary light while making it easy to manufacture this lens, by satisfying the conditional expression (3). If the ratio exceeds the upper limit of the conditional expression (3), the shape of this lens becomes closer to a biconvex shape, so that it is difficult to correct a spherical aberration occurring on each of the lens surfaces, and therefore, such a ratio is not desirable. If the ratio falls below the lower limit of the conditional expression (3), it is difficult to design the lens to prevent the direction of the normal line and the direction of the ray on each of the lens surfaces from coinciding with each other and therefore, such a ratio is not desirable.

Further, it is desirable to satisfy the following conditional expression (3a), and it is more desirable to satisfy the following conditional expression (3b).

$$-5.0 < (R1B2 + R2B2)/(R1B2 - R2B2) < -1.0 \quad (3a)$$

$$-4.0 < (R1B2 + R2B2)/(R1B2 - R2B2) < -2.0 \quad (3b)$$

In addition, it is desirable that the optical system 40 satisfy the following conditional expression (4), where the distance on the optical axis from the lens surface closest to the object to the lens surface closest to the deflection unit in the rear lens unit 42 is Lr, and the distance on the optical axis from the lens surface closest to the deflection unit in the front lens unit 41 to the lens surface closest to the object in the rear lens unit 42 is Li.

$$0.1 < Lr/Li < 4.0 \quad (4)$$

It is possible to reduce the full length of the optical system 40 while keeping the distance between the front lens unit 41 and the rear lens unit 42 appropriately, by satisfying the conditional expression (4). If the ratio exceeds the upper limit of the conditional expression (4), the distance between the front lens unit 41 and the rear lens unit 42 is short and the intermediate image 43 is too close to each of the lens surfaces, so that the influence of scratches and dust on each of the lens surfaces is large, which makes it difficult to obtain satisfactory optical performance, and therefore, such a ratio is not desirable. If the ratio falls below the lower limit of the conditional expression (4), the rear lens unit 42 and the front lens unit 41 are too far away from each other, so that the full length of the optical system 40 is long. This reduces the degree of freedom of the location of each of the lenses, and also leads to an increase in manufacturing cost because of an increase in the size of a barrel holding each of the lenses, and therefore, such a ratio is not desirable.

Further, it is desirable to satisfy the following conditional expression (4a), and it is more desirable to satisfy the following conditional expression (4b).

$$0.15 < Lr/Li < 3.00 \quad (4a)$$

$$0.2 < Lr/Li < 2.0 \quad (4b)$$

In addition, it is desirable that the optical system 40 satisfy the following conditional expression (5), where the average value in terms of the refractive index with respect to the d-line of the positive lens in the optical system 40 is NPave, and the average value in terms of the refractive index with respect to the d-line of the negative lens in the optical system 40 is NNave.

$$1.2 < NPave/NNave < 1.5 \quad (5)$$

In the present exemplary embodiment, the wavelength of the illumination light is not particularly limited. However, in particular, in a case where the optical apparatus 1 is used as a distance measuring apparatus, it is desired to use infrared light less affecting a human body as the illumination light and narrow the wavelength band of the illumination light to increase the directivity. Therefore, it is desirable to select the material of each of the lenses forming the optical system 40, considering the correction of the Petzval sum in preference to the correction of the chromatic aberration. Specifically, it is desirable that a material having a high refractive index be adopted for the positive lens, and a material having a low refractive index be adopted for the negative lens.

It is possible to correct the Petzval sum of the optical system 40 successfully and suppress the occurrence of the field curvature and the astigmatic difference, by satisfying the conditional expression (5). If the ratio exceeds the upper limit of the conditional expression (5), the degree of freedom in the selection of the material of each of the lenses decreases, so that an increase in the difficulty of manufacturing each of the lenses or a decrease in the internal transmittance can occur, and therefore, such a ratio is not desirable. If the ratio falls below the lower limit of the conditional expression (5), the Petzval sum of the optical system 40 increases, and it is difficult to correct the field curvature and the astigmatic difference, and therefore, such a ratio is not desirable.

Further, it is desirable to satisfy the following conditional expression (5a), and it is more desirable to satisfy the following conditional expression (5b).

$$1.25 < NPave/NNave < 1.45 \quad (5a)$$

$$1.3 < NPave/NNave < 1.4 \quad (5b)$$

Desirably, the front lens unit 41 according to the present exemplary embodiment consists of one or more positive lenses and one or more negative lenses. According to this configuration, it is easy to correct the Petzval sum and the spherical aberration successfully in the front lens unit 41. Further, desirably, the front lens unit 41 consists of two or more positive lenses and two or more negative lenses. According to this configuration, each of the positive refractive power and the negative refractive power can be shared by the plurality of lenses, so that the curvature of each of the lens surfaces can be reduced, making it easy to manufacture each of the lenses. In addition, the incident position of the light beam varies according to the lens, so that the plurality of aberrations are shared by the lenses and can be thereby easily corrected.

In a case where the front lens unit 41 includes a plurality of positive lenses and a plurality of negative lenses, it is desirable to alternately dispose at least one positive lens and at least one negative lens. For example, desirably, the front lens unit 41 consists of at least one positive lens, at least one negative lens, at least one positive lens, and at least one negative lens disposed in order from the object side.

In this case, the front lens unit 41 has a configuration in which the negative lens is located on the deflection unit side of a lens unit (a triplet unit) having a function similar to that of a triplet, and therefore, the spherical aberration and the astigmatic difference can be corrected successfully.

The number of the positive lenses and the negative lenses in the front lens unit 41 is not particularly limited, but, desirably, the front lens unit 41 consists of two positive lenses and two negative lenses to achieve both of the simplification and the satisfactory aberration correction of the front lens unit 41. More desirably, the front lens unit 41 consists of the positive lens, the negative lens, the positive lens, and the negative lens disposed in order from the object side to the deflection unit side.

Here, it is desirable that the optical system 40 satisfy the following conditional expression (6), where, in a case where the front lens unit 41 includes one or more positive lenses and one or more negative lenses, the average value in terms of the focal length of the positive lens in the front lens unit 41 is ffPave, and the average value in terms of the focal length of the negative lens in the front lens unit 41 is ffNave.

$$-1.0 < ffPave/ffNave < -0.2 \quad (6)$$

The relationship between the refractive power of the positive lens and the refractive power of the negative lens forming the front lens unit 41 can be made appropriate, and the aberration occurring in the positive lens can be corrected successfully by the negative lens, by satisfying the conditional expression (6). If the ratio exceeds the upper limit of the conditional expression (6), the negative refractive power in the front lens unit 41 is too large, and the focal length of the front lens unit 41 increases, making it difficult to downsize the optical system 40, and therefore, such a ratio is not desirable. If the ratio falls below the lower limit of the conditional expression (6), the positive refractive power in the front lens unit 41 is too large, so that it is difficult to correct the spherical aberration occurring in the front lens unit 41 and various aberrations occurring in the rear lens unit 42, and therefore, such a ratio is not desirable.

Further, it is desirable to satisfy the following conditional expression (6a), and it is more desirable to satisfy the following conditional expression (6b).

$$-0.8 < ffPave/ffNave < -0.3 \quad (6a)$$

$$-0.75 < ffPave/ffNave < -0.40 \quad (6b)$$

In addition, it is desirable that the optical system 40 satisfy the following conditional expression (7).

$$0.65 < fr/Lr < 2.20 \tag{7}$$

It is possible to reduce the full length of the optical system 40 while keeping the distance between the front lens unit 41 and the rear lens unit 42 appropriately, by satisfying the conditional expression (7). If the ratio exceeds the upper limit of the conditional expression (7), the focal length of the rear lens unit 42 is too long, making it difficult to downsize the optical system 40, and therefore, such a ratio is not desirable. If the ratio falls below the lower limit of the conditional expression (7), the distance between the front lens unit 41 and the rear lens unit 42 is short and the intermediate image 43 is too close to each of the lens surfaces, so that the influence of scratches and dust on each of the lens surfaces is large, making it difficult to obtain satisfactory optical performance, and therefore, such a ratio is not desirable.

Further, it is desirable to satisfy the following conditional expression (7a), and it is more desirable to satisfy the following conditional expression (7b).

$$0.70 < fr/Lr < 2.00 \tag{7a}$$

$$0.85 < fr/Lr < 1.50 \tag{7b}$$

Desirably, all the lenses forming the optical system 40 are spaced apart from each other in the optical-axis direction. In other words, desirably, the optical system 40 does not include a cemented lens, and all the lenses in the optical system 40 are single lens elements. In a case where the optical system 40 includes a cemented lens, each of the lenses forming this cemented lens can be detached or decentered by a temperature change. Therefore, the optical system 40 is configured using only the single lens elements, so that the satisfactory optical performance can be maintained even in a case where a temperature change occurs. This effect is apparent in a case where the optical system 40 is placed in an environment where the temperature frequently changes, in particular, in a case where the optical system 40 is mounted in an in-vehicle system.

As described above, in the optical apparatus 1 according to the present exemplary embodiment, both of the downsizing of the optical system 40 and the reduction of the unnecessary light can be achieved, and satisfactory optical performance can be obtained by a simple configuration. This can realize satisfactory distance measurement accuracy in a case where the optical apparatus 1 is applied to a distance measuring apparatus.

The optical system 40 according to a first embodiment of the present invention will be described below. The present embodiment corresponds to Numerical Embodiment 1 to be described below. For the optical system 40 according to the present embodiment, the description will be omitted for a configuration similar to that of the optical system 40 according to the above-described exemplary embodiment.

Figure 3:
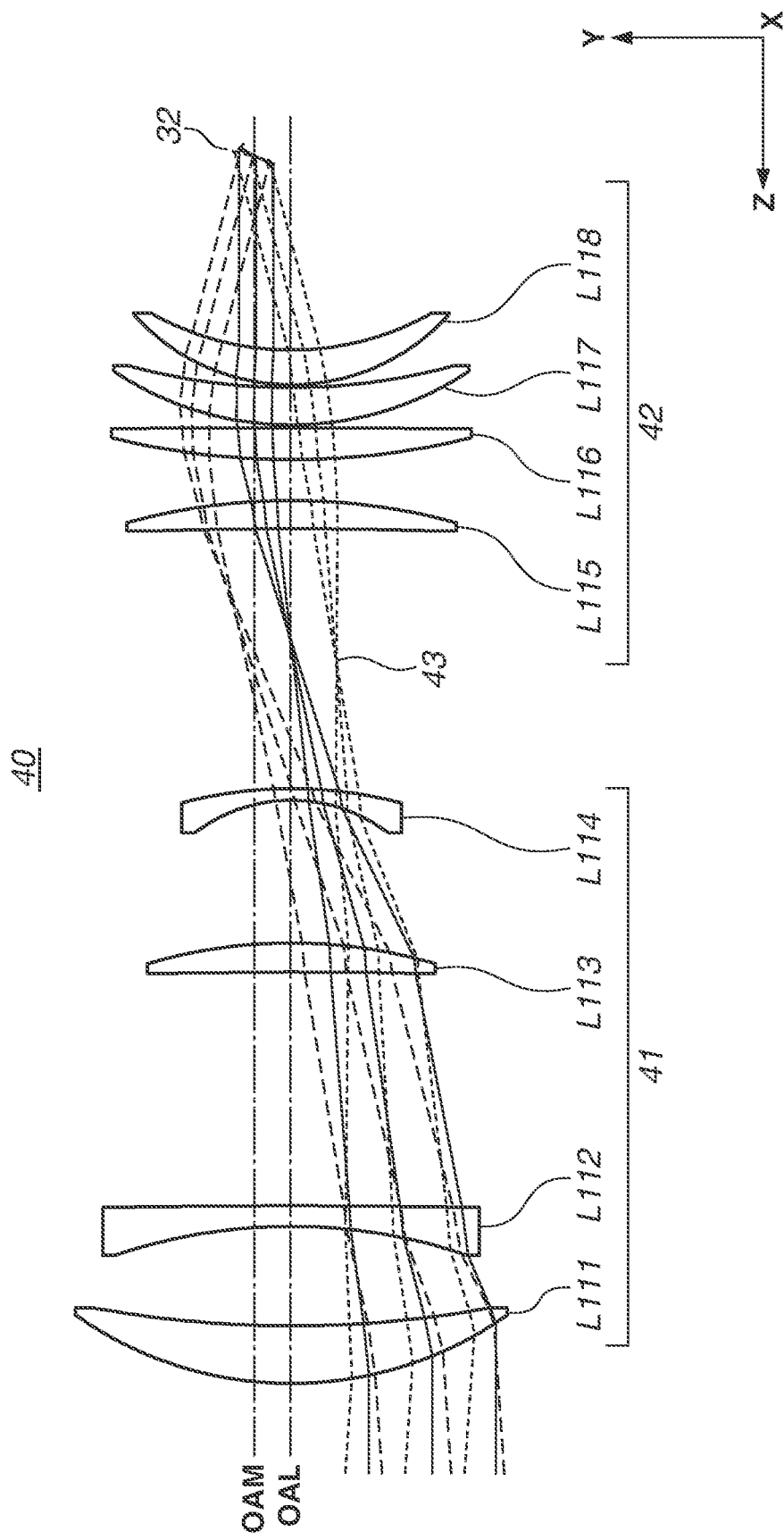
FIG. 3 is a cross-sectional diagram of an optical system according to a first embodiment.

FIG. 3 is a diagram illustrating a cross-section (the YZ cross-section) including an optical axis OAL of the optical system 40 according to the present embodiment. In FIG. 3, the object side (the +Z side) is the left side, the deflection unit side (the −Z side) is the right side, and a plurality of reflection optical paths corresponding to a plurality of angles of the drive mirror 32 is illustrated. The optical system 40 according to the present embodiment is a telescope consisting of a plurality of lenses L111 to L118 having refractive power, and having no refractive power as a whole. In the present embodiment, each of all the lens surfaces of the lenses L111 to L118 is a spherical surface, so that it is easy to manufacture each of the lenses. In addition, in the present embodiment, each of all the lenses L111 to L118 is a single lens element, so that the satisfactory environment resistance of the optical system 40 is realized.

As illustrated in FIG. 3, in the present embodiment, the drive mirror 32 is shifted in the Y-direction in such a manner that a central axis OAM of the drive mirror 32 and the optical axis OAL of the optical system 40 do not coincide with each other. The central axis OAM here coincides with the optical path of a principal ray Rc (not illustrated) at the central field angle in the scan range among the illumination light immediately after deflected by the drive mirror 32. In other words, the drive mirror 32 is disposed in such a manner that the incident point (the intersection between the deflection surface and the optical path of the principal ray Rc) of the principal ray Rc on the deflection surface and the optical axis OAL are spaced apart from each other. Further, the scan range of the drive mirror 32 is set in such a manner that the central axis OAM inclines toward (is not parallel to) the optical axis OAL. These configurations prevent the principal ray Rc from being perpendicularly incident on each of the lens surfaces, so that unnecessary light can be reduced. Further, in the present embodiment, the unnecessary light can be further reduced by designing each of the lenses to also prevent the illumination rays other than the principal ray Rc from being perpendicularly incident on each of the lens surfaces.

The front lens unit 41 according to the present embodiment consists of the positive lens L111, the negative lens L112, the positive lens L113, and the negative lens L114 disposed in order from the object side to the deflection unit side. This configuration makes it possible to correct the spherical aberration and the astigmatic difference successfully while simplifying the front lens unit 41. Specifically, a triplet group consisting of the lenses L111 to L113 for transmitting a light beam having a relatively large diameter mainly corrects the spherical aberration, and the negative lens L114 having a relatively large difference (degree of beam separation) in the transmission position of a light beam corresponding to an angle of view mainly corrects the astigmatic difference.

The rear lens unit 42 according to the present embodiment consists of the positive lens L115, the positive lens L116, the positive lens L117, and the positive lens L118 disposed in order from the object side to the deflection unit side. In other words, the rear lens unit 42 consists of four positive lenses. This configuration realizes both of the downsizing of the entire system and the satisfactory optical performance of the optical system 40.

The optical system 40 according to a second embodiment of the present invention will be described below. The present embodiment corresponds to Numerical Embodiment 2 to be described below. For the optical system 40 according to the present embodiment, the description will be omitted for a configuration similar to that of the optical system 40 according to the above-described first embodiment.

Figure 4:
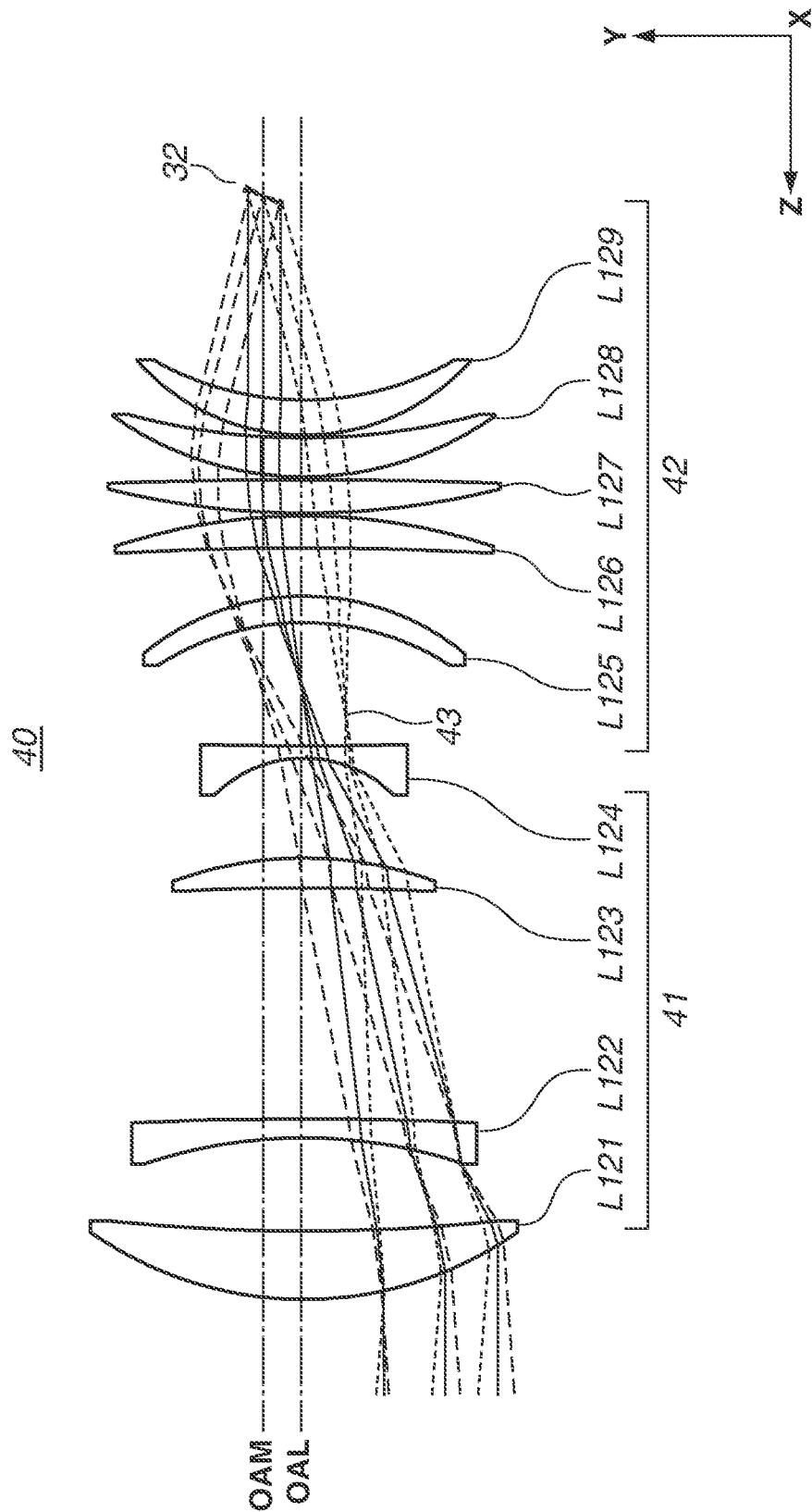
FIG. 4 is a cross-sectional diagram of an optical system according to a second embodiment.

FIG. 4 is a diagram illustrating a cross-section including the optical axis OAL of the optical system 40 according to the present embodiment. The optical system 40 according to the present embodiment is a telescope consisting of lenses L121 to L129, and having no refractive power as a whole. The optical system 40 according to the present embodiment is designed to prevent each of the illumination rays from being perpendicularly incident on each of the lens surfaces as in the first embodiment.

The front lens unit 41 according to the present embodiment consists of the positive lens L121, the negative lens L122, the positive lens L123, and the negative lens L124 disposed in order from the object side to the deflection unit side. The rear lens unit 42 according to the present embodiment consists of the positive lens L125, the positive lens L126, the positive lens L127, the positive lens L128, and the positive lens L129 disposed in order from the object side to the deflection unit side. In other words, the rear lens unit 42 consists of five positive lenses. The number of the positive lenses in the rear lens unit 42 according to the present embodiment is larger than that of the first embodiment by one, which can increase the positive refractive power of the rear lens unit 42, and also increase the positive refractive power of the front lens unit 41 accordingly, so that the optical system 40 can be further downsized.

The optical system 40 according to a third embodiment of the present invention will be described below. The present embodiment corresponds to Numerical Embodiment 3 to be described below. For the optical system 40 according to the present embodiment, the description will be omitted for a configuration similar to that of the optical system 40 according to the above-described first embodiment.

Figure 5:
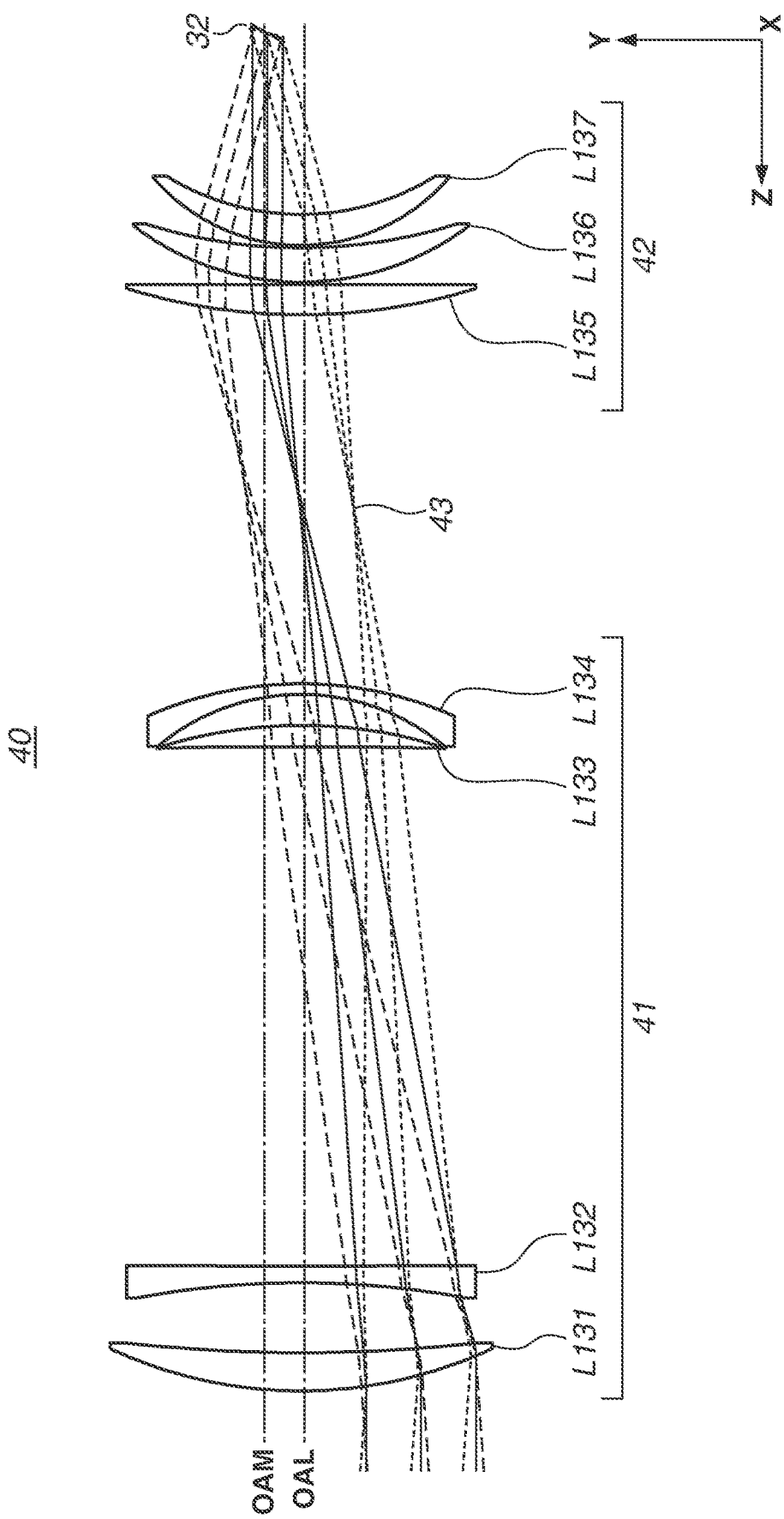
FIG. 5 is a cross-sectional diagram of an optical system according to a third embodiment.

FIG. 5 is a diagram illustrating a cross-section including the optical axis OAL of the optical system 40 according to the present embodiment. The optical system 40 according to the present embodiment is a telescope consisting of lenses L131 to L137, and having no refractive power as a whole. The optical system 40 according to the present embodiment is designed to prevent each of the illumination rays from being perpendicularly incident on each of the lens surfaces as in the first embodiment.

The front lens unit 41 according to the present embodiment consists of the positive lens L131, the negative lens L132, the positive lens L133, and the negative lens L134 disposed in order from the object side to the deflection unit side. The rear lens unit 42 according to the present embodiment consists of the positive lens L135, the positive lens L136, and the positive lens L137 disposed in order from the object side to the deflection unit side. In other words, the rear lens unit 42 consists of three positive lenses. The number of the positive lenses in the rear lens unit 42 according to the present embodiment is smaller than that of the first embodiment by one, and therefore, the rear lens unit 42 can be further simplified, and the distance between the intermediate image 43 and each of the lens surfaces in front of and behind the intermediate image 43 can be sufficiently secured by increasing the distance between the front lens unit 41 and the rear lens unit 42.

The optical system 40 according to a fourth embodiment of the present invention will be described below. The present embodiment corresponds to Numerical Embodiment 4 to be described below. For the optical system 40 according to the present embodiment, the description will be omitted for a configuration similar to that of the optical system 40 according to the above-described first embodiment.

Figure 6:
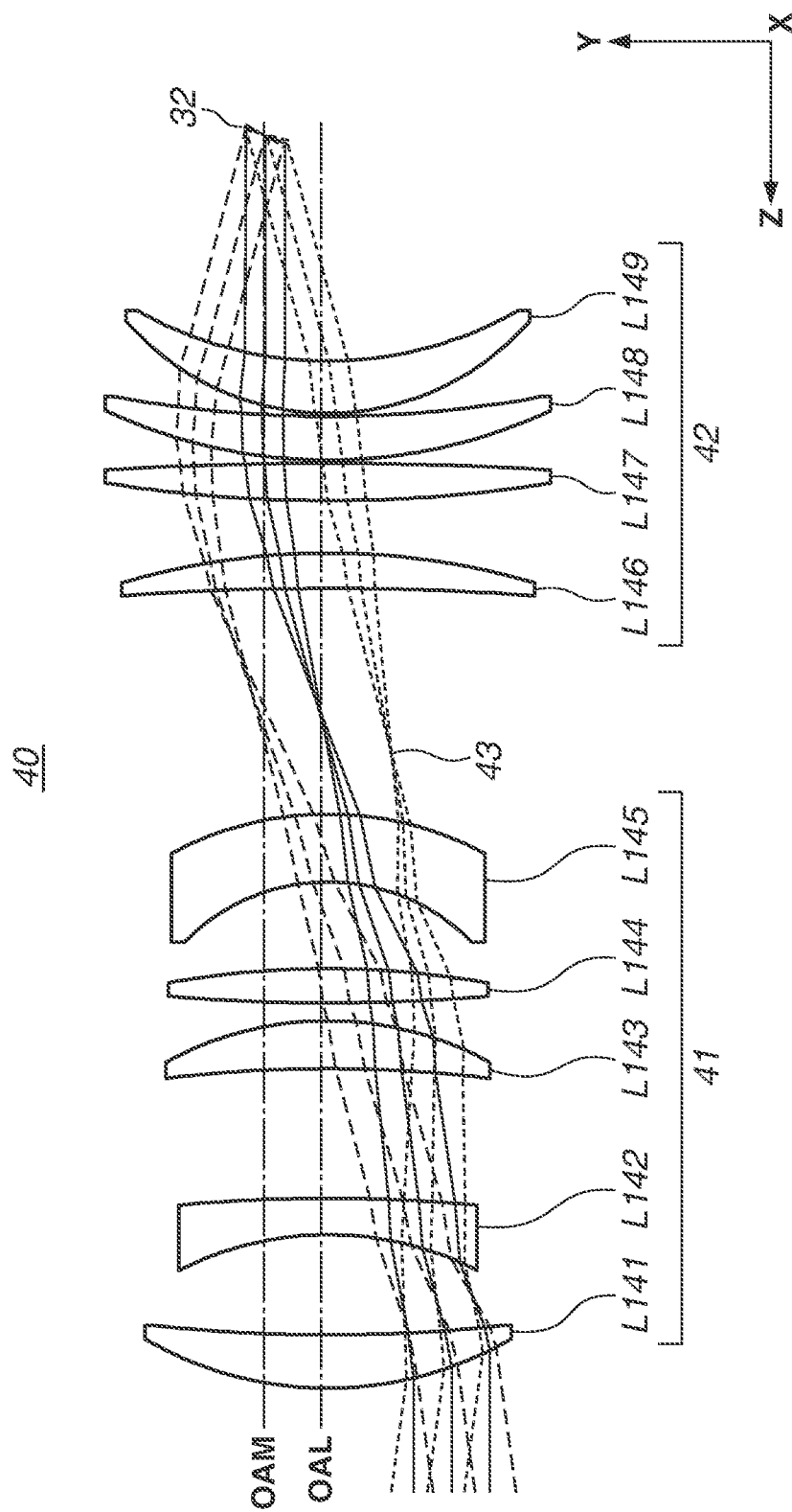
FIG. 6 is a cross-sectional diagram of an optical system according to a fourth embodiment.

FIG. 6 is a diagram illustrating a cross-section including the optical axis OAL of the optical system 40 according to the present embodiment. The optical system 40 according to the present embodiment is a telescope consisting of lenses L141 to L149, and having no refractive power as a whole. The optical system 40 according to the present embodiment is designed to prevent each of the illumination rays from being perpendicularly incident on each of the lens surfaces as in the first embodiment.

The front lens unit 41 according to the present embodiment consists of the positive lens L141, the negative lens L142, the positive lens L143, the positive lens L144, and the negative lens L145 disposed in order from the object side to the deflection unit side.

The rear lens unit 42 according to the present embodiment consists of the positive lens L146, the positive lens L147, the positive lens L148, and the positive lens L149 disposed in order from the object side to the deflection unit side. In other words, the rear lens unit 42 consists of four positive lenses.

The optical magnification ($\beta=2.0$) of the optical system 40 according to the present embodiment is lower than the optical magnification ($\beta \geq 3.5$) of the optical system 40 according to each of the first to third embodiments. Therefore, the optical system 40 according to the present embodiment is suitable for the detection of the target object 100 at a short distance in comparison with the optical system 40 according to each of the first to third embodiments. In such a configuration as well, both of the downsizing and the satisfactory optical performance of the optical system 40 can be achieved by appropriately designing the rear lens unit 42.

Numerical Embodiments

Numerical Embodiments 1 to 4 of the optical system 40 corresponding to the first to fourth embodiments described above will be described below. In surface data, the surface number indicates the position of the lens surface in the order when counted from the object side, r indicates the curvature radius [mm] of the lens surface, and d indicates the distance [mm] on the optical axis between the adjacent lens surfaces. Further, nd indicates the refractive index with respect to the d-line (a wavelength of 587.6 nm) of a medium between the adjacent lens surfaces, and vd indicates the Abbe number based on the d-line of the medium between the adjacent lens surfaces.

In various kinds of data, the optical magnification 13 indicates the magnification (at the time of illumination) of the optical system 40, and the entrance pupil diameter indicates the diameter [mm] of the entrance pupil of the optical system 40 when the target object 100 side is the incident side (at the time of light receiving). Further, the shift amount indicates the distance [mm] between the central axis OAM and the optical axis OAL in the YZ cross-section, and the tilt amount indicates the angle [degree] formed by the central axis OAM and the optical axis OAL in the YZ cross-section.

The ray angle data indicates the angle [degree] between the optical axis OAL and each of the principal ray (central ray) and the marginal rays (upper and lower rays) among the reflected light from the target object 100 illuminated by the illumination light at the central field angle in the scan range of the drive mirror 32. Here, the indicated data includes the angle of each ray immediately before being incident on the lens surface closest to the object in the optical system 40, the angle of each ray immediately after being output from the lens surface closest to the deflection unit in the optical system 40, and the difference between these angles.

(Numerical Embodiment 1)

Surface data

| Lens | Surface number | r | d | nd | vd |
|---|---|---|---|---|---|
| L111 | 1 | 41.107 | 6.30 | 2.001 | 29.139 |
|  | 2 | 119.720 | 10.91 |  |  |
| L112 | 3 | −60.247 | 2.00 | 1.516 | 64.141 |
|  | 4 | 1918.293 | 25.88 |  |  |
| L113 | 5 | −654.854 | 3.20 | 2.001 | 29.139 |
|  | 6 | −55.770 | 15.63 |  |  |
| L114 | 7 | −17.579 | 1.30 | 1.516 | 64.141 |
|  | 8 | −46.620 | 28.47 |  |  |
| L115 | 9 | −495.348 | 3.10 | 2.001 | 29.139 |
|  | 10 | −68.368 | 4.50 |  |  |
| L116 | 11 | 82.093 | 3.50 | 2.001 | 29.139 |
|  | 12 | −1551.590 | 0.30 |  |  |
| L117 | 13 | 35.125 | 4.10 | 2.001 | 29.139 |
|  | 14 | 67.954 | 0.30 |  |  |
| L118 | 15 | 23.198 | 3.80 | 2.001 | 29.139 |
|  | 16 | 31.108 |  |  |  |

Various kinds of data

| | |
|---|---|
| Optical magnification β | 3.8 |
| Entrance pupil diameter [mm] | 14.8 |
| Shift amount [mm] | 4.1 |
| Tilt amount [degree] | 9.6 |

Ray angle data

| | Object side | Deflection unit side | Difference |
|---|---|---|---|
| Upper ray | 0.041 | 0.050 | 0.009 |
| Principal ray | 0.035 | 0.000 | −0.035 |
| Lower ray | 0.028 | −0.052 | −0.080 |

(Numerical Embodiment 2)

Surface data

| Lens | Surface number | r | d | nd | vd |
|---|---|---|---|---|---|
| L121 | 1 | 39.383 | 7.25 | 2.001 | 29.139 |
|  | 2 | 202.116 | 9.86 |  |  |
| L122 | 3 | −52.981 | 2.00 | 1.516 | 64.141 |
|  | 4 | −401.197 | 24.46 |  |  |
| L123 | 5 | −228.481 | 3.16 | 2.001 | 29.139 |
|  | 6 | −40.023 | 10.55 |  |  |
| L124 | 7 | −13.435 | 1.30 | 1.516 | 64.141 |
|  | 8 | 363.802 | 13.05 |  |  |
| L125 | 9 | −28.664 | 2.80 | 2.001 | 29.139 |
|  | 10 | −26.765 | 5.12 |  |  |
| L126 | 11 | −343.608 | 3.38 | 2.001 | 29.139 |
|  | 12 | −63.244 | 0.30 |  |  |
| L127 | 13 | 85.978 | 3.54 | 2.001 | 29.139 |
|  | 14 | −523.346 | 0.30 |  |  |
| L128 | 15 | 34.916 | 4.10 | 2.001 | 29.139 |
|  | 16 | 70.744 | 0.30 |  |  |
| L129 | 17 | 23.759 | 3.72 | 2.001 | 29.139 |
|  | 18 | 32.157 |  |  |  |

Various kinds of data

| | |
|---|---|
| Optical magnification β | 3.5 |
| Entrance pupil diameter [mm] | 14.8 |
| Shift amount [mm] | 4.3 |
| Tilt amount [degree] | 9.4 |

(Numerical Embodiment 2)

Ray angle data

| | Object side | Deflection unit side | Difference |
|---|---|---|---|
| Upper ray | 0.039 | 0.069 | 0.030 |
| Principal ray | 0.033 | 0.000 | −0.033 |
| Lower ray | 0.028 | 0.103 | 0.075 |

(Numerical Embodiment 3)

Surface data

| Lens | Surface number | r | d | nd | vd |
|---|---|---|---|---|---|
| L131 | 1 | 55.792 | 4.65 | 2.001 | 29.139 |
|  | 2 | 199.307 | 8.49 |  |  |
| L132 | 3 | −110.557 | 2.00 | 1.516 | 64.141 |
|  | 4 | 2336.958 | 63.19 |  |  |
| L133 | 5 | −717.748 | 2.60 | 2.001 | 29.139 |
|  | 6 | −57.176 | 3.76 |  |  |
| L134 | 7 | −27.455 | 1.30 | 1.516 | 64.141 |
|  | 8 | −46.650 | 44.86 |  |  |
| L135 | 11 | 73.363 | 3.67 | 2.001 | 29.139 |
|  | 12 | 10121.070 | 0.30 |  |  |
| L136 | 13 | 34.226 | 4.19 | 2.001 | 29.139 |
|  | 14 | 64.311 | 0.30 |  |  |
| L137 | 15 | 24.042 | 3.75 | 2.001 | 29.139 |
|  | 16 | 31.557 |  |  |  |

Various kinds of data

| | |
|---|---|
| Optical magnification β | 3.5 |
| Entrance pupil diameter [mm] | 14.8 |
| Shift amount [mm] | 4.1 |
| Tilt amount [degree] | 9.5 |

Ray angle data

| | Object side | Deflection unit side | Difference |
|---|---|---|---|
| Upper ray | 0.038 | −0.014 | −0.052 |
| Principal ray | 0.032 | 0.000 | −0.032 |
| Lower ray | 0.026 | 0.068 | 0.042 |

(Numerical Embodiment 4)

Surface data

| Lens | Surface number | r | d | nd | vd |
|---|---|---|---|---|---|
| L141 | 1 | 34.971 | 5.10 | 2.001 | 29.139 |
|  | 2 | 153.153 | 9.60 |  |  |
| L142 | 3 | −31.435 | 3.50 | 1.516 | 64.141 |
|  | 4 | −157.459 | 12.40 |  |  |
| L143 | 5 | −131.553 | 4.60 | 1.516 | 64.141 |
|  | 6 | −32.263 | 1.70 |  |  |
| L144 | 7 | 179.847 | 3.30 | 2.001 | 29.139 |
|  | 8 | −85.115 | 8.30 |  |  |
| L145 | 9 | −19.306 | 6.50 | 1.516 | 64.141 |
|  | 10 | 31.578 | 21.60 |  |  |
| L146 | 11 | −290.125 | 3.40 | 2.001 | 29.139 |
|  | 12 | −69.894 | 5.00 |  |  |
| L147 | 13 | 133.185 | 3.60 | 2.001 | 29.139 |
|  | 14 | −361.726 | 0.30 |  |  |
| L148 | 15 | 50.144 | 4.20 | 2.001 | 29.139 |
|  | 16 | 112.513 | 0.30 |  |  |

-continued (Numerical Embodiment 4)

| L149 | 17 | 25.536 | 5.00 | 2.001 | 29.139 |
|---|---|---|---|---|---|
|  | 18 | 36.897 |  |  |  |

Various kinds of data

| Optical magnification β | 2.0 |
|---|---|
| Entrance pupil diameter [mm] | 14.8 |
| Shift amount [mm] | 6.0 |
| Tilt amount [degree] | 15.6 |

Ray angle data

|  | Object side | Deflection unit side | Difference |
|---|---|---|---|
| Upper ray | 0.080 | 0.138 | 0.058 |
| Principal ray | 0.073 | 0.000 | −0.073 |
| Lower ray | 0.066 | −0.226 | −0.292 |

Various numerical values in Numerical Embodiments 1 to 4 are indicated in Table 1. As indicated in Table 1, the optical system 40 according to any of Numerical Embodiments 1 to 4 satisfies the above-described conditional expressions (1) to (7).

TABLE 1

|  |  | First embodiment | Second embodiment | Third embodiment | Fourth embodiment |
|---|---|---|---|---|---|
|  | ff [mm] | 74.936 | 59.738 | 89.411 | 44.766 |
|  | fr [mm] | 19.935 | 17.000 | 25.329 | 22.532 |
|  | R1B1 [mm] | 23.198 | 23.759 | 24.042 | 25.536 |
|  | R2B1 [mm] | 31.108 | 32.157 | 31.557 | 36.897 |
|  | R1B2 [mm] | 35.125 | 34.916 | 34.226 | 50.144 |
|  | R2B2 [mm] | 67.954 | 70.744 | 64.311 | 112.513 |
|  | Lr [mm] | 19.600 | 23.566 | 12.206 | 21.800 |
|  | Li [mm] | 28.470 | 13.048 | 44.858 | 21.600 |
|  | NPave | 2.001 | 2.001 | 2.001 | 2.001 |
|  | NNave | 1.516 | 1.516 | 1.516 | 1.516 |
|  | ffPave [mm] | 62.271 | 49.389 | 71.144 | 64.231 |
|  | ffNave [mm] | −85.616 | −72.885 | −170.964 | −98.477 |
| Conditional expression (1) | ff/fr | 3.759 | 3.514 | 3.530 | 1.987 |
| Conditional expression (2) | (R1B1 + R2B1)/(R1B1 − R2B1) | −6.865 | −6.658 | −7.398 | −5.495 |
| Conditional expression (3) | (R1B2 + R2B2)/(R1B2 − R2B2) | −3.140 | −2.949 | −3.275 | −2.608 |
| Conditional expression (4) | Lr/Li | 0.688 | 1.806 | 0.272 | 1.009 |
| Conditional expression (5) | NPave/NNave | 1.320 | 1.320 | 1.320 | 1.320 |
| Conditional expression (6) | ffPave/ffNave | −0.727 | −0.678 | −0.416 | −0.652 |
| Conditional expression (7) | fr/Lr | 1.017 | 0.721 | 2.075 | 1.034 |

[In-Vehicle System]

Figure 7:
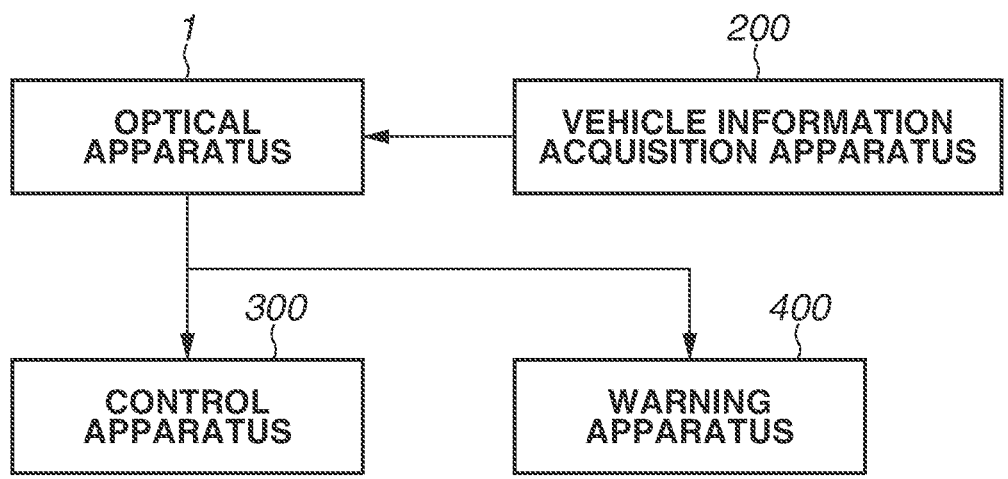
FIG. 7 is a functional block diagram of an in-vehicle system according to the exemplary embodiment.

FIG. 7 illustrates a configuration of an in-vehicle system (driving assistance apparatus) 1000 including the optical apparatus 1 according to the present exemplary embodiment. The in-vehicle system 1000 is held by a movable moving body (moving apparatus) such as an automobile (vehicle), and used to assist the driving (operation) of the vehicle, based on the distance information of a target object such as an obstacle or a pedestrian near the vehicle acquired by the optical apparatus 1.

Figure 8:
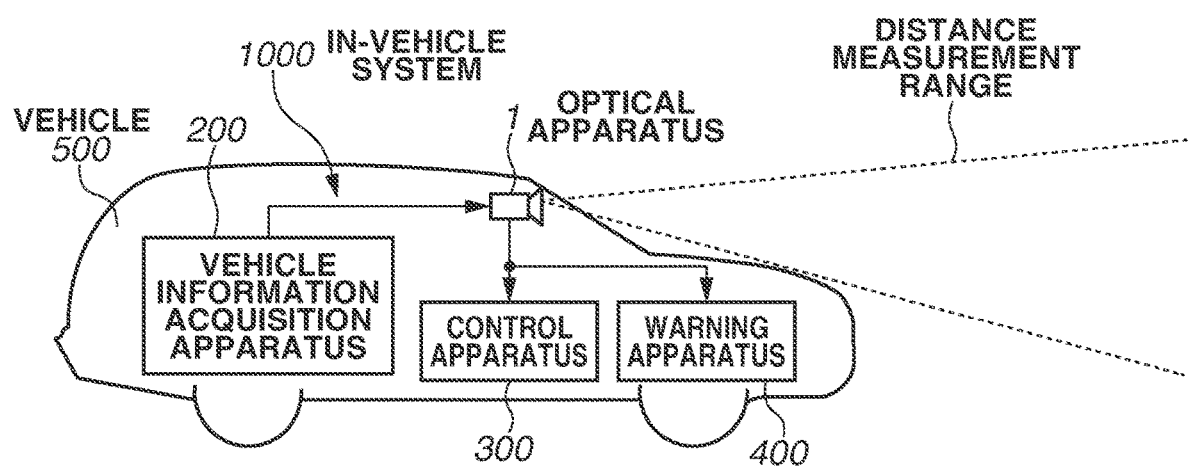
FIG. 8 is a schematic diagram of a vehicle (moving apparatus) according to the exemplary embodiment.

FIG. 8 is a schematic diagram of a vehicle (moving apparatus) 500 including the in-vehicle system 1000. FIG. 8 illustrates a case where a distance measurement range (detection range) of the optical apparatus 1 is set in front of the vehicle 500, but the distance measurement range may be set behind or beside the vehicle 500.

As illustrated in FIG. 7, the in-vehicle system 1000 includes the optical apparatus 1, a vehicle information acquisition apparatus 200, a control apparatus (electronic control unit (ECU)) 300, and a warning apparatus (warning unit) 400. In the in-vehicle system 1000, the control unit 60 included in the optical apparatus 1 has a function as a distance acquisition unit (acquisition unit) and a collision determination unit (determination unit). However, the distance acquisition unit and the collision determination unit may each be provided as a unit separate from the control unit 60 in the in-vehicle system 1000, or may each be provided outside the optical apparatus 1 (e.g., inside the vehicle 500), as needed. Alternatively, the control apparatus 300 may be used as the control unit 60.

Figure 9:
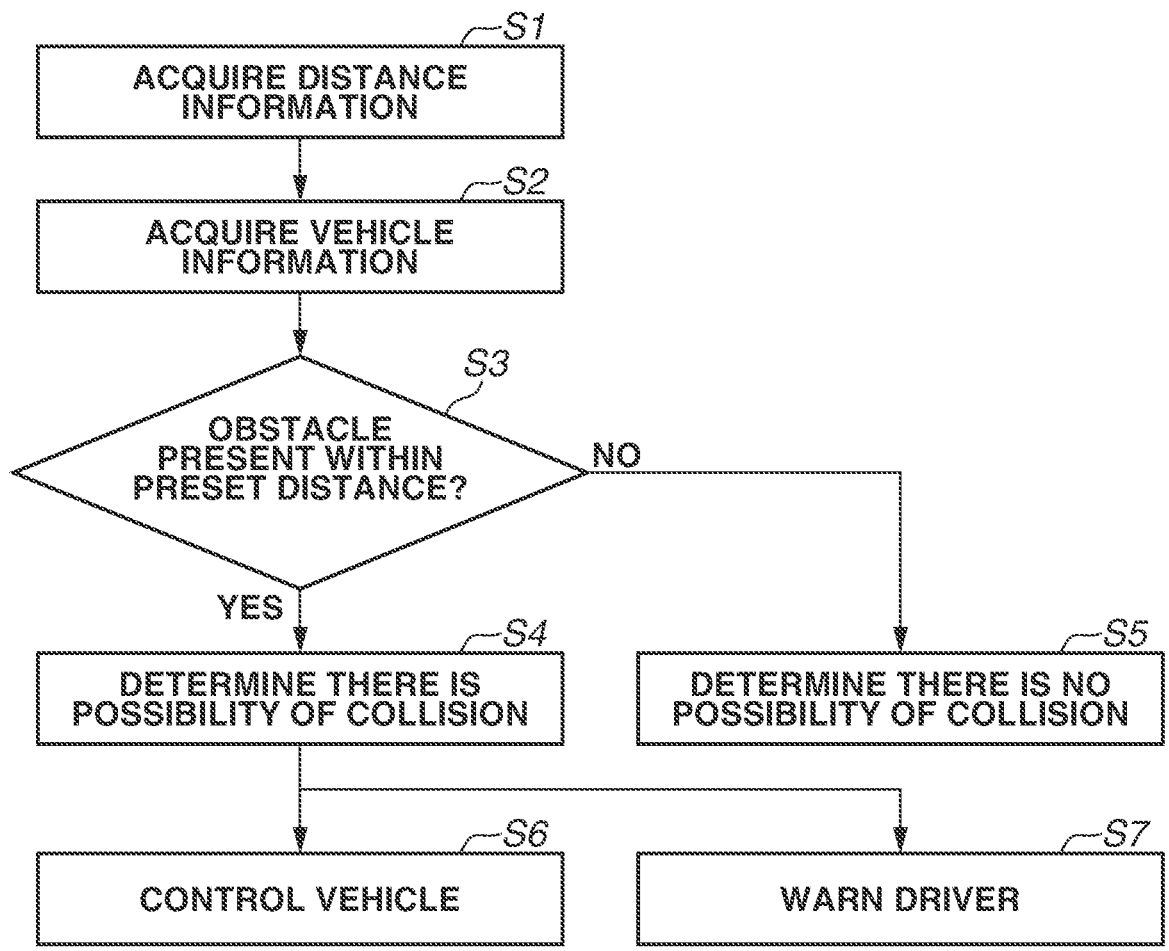
FIG. 9 is a flowchart illustrating an operation example of the in-vehicle system according to the exemplary embodiment.

FIG. 9 is a flowchart illustrating an example of operation of the in-vehicle system 1000 according to the present exemplary embodiment. The operation of the in-vehicle system 1000 will be described below with reference to this flowchart.

First, in step S1, the light source unit 10 of the optical apparatus 1 illuminates a target object near the vehicle, and the control unit 60 acquires the distance information of the target object, based on a signal output by the light receiving unit 50 by receiving the reflected light from the target object. In step S2, the vehicle information acquisition apparatus 200 acquires vehicle information including the speed, yaw rate, and steering angle of the vehicle. Subsequently, in step S3, the control unit 60 determines whether the distance to the target object is within the range of a preset distance, using the distance information acquired in step S1 and the vehicle information acquired in step S2.

This makes it possible to determine whether the target object is present within the preset distance from the vehicle, and determine a possibility of a collision between the vehicle and the target object. Step S1 and step S2 may be performed in reverse order, or may be performed in parallel. If the target object is present within the preset distance (YES in step S4), the operation proceeds to step S4. In step S4, the control unit 60 determines that "there is a possibility of a collision". If the target object is not present within the preset distance (NO in step S4), the operation proceeds to step S5. In step S5, the control unit 60 determines that "there is no possibility of a collision".

Next, in the case where the control unit 60 determines that "there is a possibility of a collision", the control unit 60 notifies (transmits) this determination result to the control apparatus 300 and the warning apparatus 400. In this case, in step S6, the control apparatus 300 controls the vehicle based on the determination result from the control unit 60, and in step S7, the warning apparatus 400 warns a user (driver) of the vehicle based on the determination result from the control unit 60. The determination result may be notified at least one of the control apparatus 300 and the warning apparatus 400.

The control apparatus 300 controls the vehicle, for example, to apply a brake, release the accelerator, turn a steering wheel, and suppress the output of an engine or a motor by generating a control signal for generating a braking force on each wheel. The warning apparatus 400 gives a warning to the driver by, for example issuing a warning sound, displaying warning information on a screen of a car navigation system, or vibrating a seat belt or steering wheel.

As described above, the in-vehicle system 1000 according to the present exemplary embodiment can detect the object and measure the distance by performing the above-described processing, so that the collision between the vehicle and the object can be avoided. In particular, the distance can be accurately measured by applying the optical apparatus 1 according to each of the above-described embodiments to the in-vehicle system 1000, so that the target object can be accurately detected and the collision can be accurately determined.

In the present exemplary embodiment, the in-vehicle system 1000 is applied to the driving assistance (collision damage reduction), but is not limited thereto. The in-vehicle system 1000 may be applied to cruise control (including all vehicle speed tracking function) and automatic driving. The in-vehicle system 1000 is applicable not only to a vehicle such an automobile but also to a moving body such as a ship, an aircraft, or an industrial robot. The in-vehicle system 1000 is also applicable not only to a moving body but also to various apparatuses that use object recognition of an Intelligent Transport System (ITS), a surveillance system, or the like.

The in-vehicle system 1000 and the moving apparatus 500 may include a notification apparatus (notification unit) for notifying the manufacturer of the in-vehicle system 1000 and the seller (dealer) of the moving apparatus 500 of the fact that the moving apparatus 500 has collided with an obstacle in a case where this collision has occurred. For example, an apparatus that transmits information (collision information) about the collision between the moving apparatus 500 and the obstacle to a preset external destination by e-mail or the like can be adopted as the notification apparatus.

In this way, the configuration is adopted in which the notification apparatus automatically notifies the collision information, so that measures such as an inspection and a repair after the collision can be immediately performed. The destination of the collision information may be an arbitrary place set by a user, such as an insurance company, a medical institution, or the police.

The notification apparatus may be configured to notify the destination of failure information of each part and consumption information of consumables in addition to the collision information. The presence or absence of the collision may be detected using the distance information acquired based on the output from the above-described light receiving unit 50, or may be detected using another detection unit (sensor).

[Modifications]

While the present invention has been described above with reference to the exemplary embodiment and embodiments, the present invention is not limited to these exemplary embodiment and embodiments, and various combinations, modifications, and changes can be made within the scope of the gist of the present invention.

For example, the optical system 40 according to each of the embodiments may be an optical system that increases the diameter of the reflected light from the target object, as needed, instead of being the telescope that reduces the diameter of the reflected light from the target object 100. The optical system 40 may also be an optical system having refractive power as a whole, as needed, instead of being the afocal system.

In each of the embodiments, the members are integrated (integrally held), but may each be configured as a separate member as needed. For example, the light source unit 10 and the light receiving unit 50 may each be detachable from the light guiding unit 20 or the deflection unit 30. In that case, holding members (housings) that hold the respective members may be provided with connection portions (coupling portions) for connecting to each other. In this case, to improve the accuracy of the positioning between the light source unit 10 and the light guiding unit 20, the diaphragm 13 may be disposed inside the light guiding unit 20 and held by a holding member common to the light-guiding member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2021-007468, filed Jan. 20, 2021, No. 2021-007469, filed Jan. 20, 2021, and No. 2021-007470, filed Jan. 20, 2021, which are hereby incorporated by reference herein in their entirety.

What is claimed is:

1. An optical apparatus comprising:
   a deflection unit configured to deflect illumination light from a light source to scan an object and to deflect reflected light from the object;
   a light guiding unit configured to guide the illumination light from the light source to the deflection unit and to guide the reflected light from the deflection unit to a light receiving element; and
   an optical system configured to guide the illumination light from the deflection unit to the object and to guide the reflected light from the object to the deflection unit,
   wherein the optical system includes a front lens unit that is configured to form an intermediate image of the object and consists of lenses located closer to the object than the intermediate image and a rear lens unit that consists of lenses located closer to the deflection unit than the intermediate image,
   wherein the rear lens unit consists of three or more and five or less positive lenses, and
   wherein the following conditional expression is satisfied:

$$-12.0 < (R1B1 + R2B1)/(R1B1 - R2B1) < -2.0$$

where R1B1 is a curvature radius of a lens surface on the object side for a first lens closest to the deflection unit in the rear lens unit, and R2B1 is a curvature radius of a lens surface on the deflection unit side for the first lens.

2. The optical apparatus according to claim 1, wherein the following conditional expression is satisfied:

$$1.8 < ff/fr < 8.0$$

where ff is a focal length of the front lens unit, and fr is a focal length of the rear lens unit.

3. The optical apparatus according to claim 1, wherein the following conditional expression is satisfied:

$$-6.0 < (R1B2 + R2B2)/(R1B2 - R2B2) < -0.5$$

where, R1B2 is a curvature radius of a lens surface on the object side for a second lens adjacent to the first lens, and R2B2 is a curvature radius of a lens surface on the deflection unit side for the second lens.

4. The optical apparatus according to claim 1, wherein the following conditional expression is satisfied:

$$0.1 < Lr/Li < 4.0$$

where Lr is a distance on an optical axis from a lens surface closest to the object to a lens surface closest to the deflection unit in the rear lens unit, and Li is a distance on the optical axis from a lens surface closest to the deflection unit in the front lens unit to the lens surface closest to the object in the rear lens unit.

5. The optical apparatus according to claim 1, wherein the following conditional expression is satisfied:

$$1.2 < NPave/NNave < 1.5$$

where NPave is an average value in terms of a refractive index with respect to a d-line of a positive lens in the optical system, and NNave is an average value in terms of a refractive index with respect to a d-line of a negative lens in the optical system.

6. The optical apparatus according to claim 1,
wherein the front lens unit includes one or more positive lenses and one or more negative lenses, and
wherein the following conditional expression is satisfied:

$$-1.0 < ffPave/ffNave < -0.2$$

where ffPave is an average focal length of the one or more positive lenses, and ffNave is an average focal length of the one or more negative lenses.

7. The optical apparatus according to claim 1, wherein the front lens unit consists of two or more positive lenses and two or more negative lenses.

8. The optical apparatus according to claim 7, wherein the front lens unit consists of at least one positive lens, at least one negative lens, at least one positive lens, and at least one negative lens disposed in order from the object side to the deflection unit side.

9. The optical apparatus according to claim 1, wherein the following conditional expression is satisfied:

$$0.65 < fr/Lr < 2.20$$

where fr is a focal length of the rear lens unit, and Lr is a distance on an optical axis between a lens surface closest to the object in the rear lens unit and a lens surface closest to the deflection unit in the rear lens unit.

10. The optical apparatus according to claim 1, wherein all the lenses in the optical system are spaced apart from each other in an optical-axis direction.

11. The optical apparatus according to claim 1, wherein a normal line at an incident point of an illumination ray of the illumination light from the deflection unit and the illumination ray are not parallel to each other on each of a plurality of lens surfaces included in the optical system.

12. The optical apparatus according to claim 1, wherein the deflection unit is disposed so as not to make an optical path of a principal ray of the illumination light at a central field angle in a scan range of the deflection unit and an optical axis of the optical system coincide with each other.

13. The optical apparatus according to claim 1, wherein the optical system increases a diameter of the illumination light from the deflection unit and reduces a diameter of the reflected light from the object.

14. The optical apparatus according to claim 1, wherein the optical system has no refractive power as a whole.

15. An in-vehicle system comprising the optical apparatus according to claim 1, and configured to determine a possibility of a collision between a vehicle and the object, based on distance information of the object obtained by the optical apparatus.

16. The in-vehicle system according to claim 15, further comprising a control apparatus configured to output a control signal for generating a braking force in the vehicle, in a case where a possibility of a collision between the vehicle and the object is determined to be present.

17. The in-vehicle system according to claim 15, further comprising a warning apparatus configured to warn a driver of the vehicle, in a case where a possibility of a collision between the vehicle and the object is determined to be present.

18. A moving apparatus comprising the optical apparatus according to claim 1, and configured to move while holding the optical apparatus.

19. An optical apparatus comprising:
a deflection unit configured to deflect illumination light from a light source to scan an object and to deflect reflected light from the object;
a light guiding unit configured to guide the illumination light from the light source to the deflection unit and to guide the reflected light from the deflection unit to a light receiving element; and
an optical system configured to guide the illumination light from the deflection unit to the object and to guide the reflected light from the object to the deflection unit,
wherein the optical system includes a front lens unit that is configured to form an intermediate image of the object and consists of lenses located closer to the object than the intermediate image and a rear lens unit that consists of lenses located closer to the deflection unit than the intermediate image,
wherein the front lens unit includes one or more positive lenses and one or more negative lenses, and
wherein the following conditional expression is satisfied:

$$-1.0 < ffPave/ffNave < -0.2$$

where ffPave is an average focal length of the one or more positive lenses, and ffNave is an average focal length of the one or more negative lenses.

20. An optical apparatus comprising:
a deflection unit configured to deflect illumination light from a light source to scan an object and to deflect reflected light from the object;
a light guiding unit configured to guide the illumination light from the light source to the deflection unit and to guide the reflected light from the deflection unit to a light receiving element; and
an optical system configured to guide the illumination light from the deflection unit to the object and to guide the reflected light from the object to the deflection unit,
wherein the optical system includes a front lens unit that is configured to form an intermediate image of the object and consists of lenses located closer to the object than the intermediate image and a rear lens unit that consists of lenses located closer to the deflection unit than the intermediate image, and
wherein the following conditional expression is satisfied:

$$0.65 < fr/Lr < 2.20$$

where fr is a focal length of the rear lens unit, and Lr is a distance on an optical axis between a lens surface closest to the object in the rear lens unit and a lens surface closest to the deflection unit in the rear lens unit.

* * * * *